(12) United States Patent
Kanemitsu et al.

(10) Patent No.: US 8,885,072 B2
(45) Date of Patent: Nov. 11, 2014

(54) SOLID-STATE IMAGING DEVICE, IMAGING METHOD, AND CAMERA MODULE

(71) Applicant: Kabushiki Kaisha Toshiba, Minato-ku (JP)

(72) Inventors: Shiroshi Kanemitsu, Kanagawa (JP); Teppei Nakano, Kanagawa (JP); Hidetoshi Kono, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 10 days.

(21) Appl. No.: 13/924,883

(22) Filed: Jun. 24, 2013

(65) Prior Publication Data

US 2014/0204256 A1   Jul. 24, 2014

(30) Foreign Application Priority Data

Jan. 22, 2013  (JP) .................................. 2013-009624

(51) Int. Cl.
*H04N 5/217*  (2011.01)
(52) U.S. Cl.
CPC .................................. *H04N 5/2173* (2013.01)
USPC .......................................... 348/241; 348/308
(58) Field of Classification Search
CPC ...................................................... H04N 5/361
USPC ............. 348/241, 222.1, 294, 308; 250/208.1
See application file for complete search history.

(56) References Cited

U.S. PATENT DOCUMENTS

| 8,233,737 B2 | 7/2012 | Takahashi et al. |
| 8,692,176 B2 * | 4/2014 | Kelly et al. ................. 250/208.1 |
| 8,760,542 B2 * | 6/2014 | Bridge et al. .................. 348/241 |

FOREIGN PATENT DOCUMENTS

| JP | 2004-289241 | 10/2004 |
| JP | 2009-105581 | 5/2009 |
| JP | 2010-130194 | 6/2010 |

* cited by examiner

*Primary Examiner* — Tuan Ho
(74) *Attorney, Agent, or Firm* — Oblon, Spivak, McClelland, Maier & Neustadt, L.L.P.

(57) ABSTRACT

According to one embodiment, a solid-state imaging device includes an output level determining unit, a random number data generating unit, and an output selecting unit. The output level determining unit performs a level determination of a digital output signal by comparing a level of the digital output signal with a threshold value. The random number data generating unit generates random number data by random number processing on the level of the digital output signal. The output selecting unit selects any of: the digital output signal subjected to an addition of the random number data, and the digital output signal not subjected to the addition of the random number data corresponding to a result of the level determination.

20 Claims, 8 Drawing Sheets

SOLID-STATE IMAGING DEVICE, IMAGING METHOD, AND CAMERA MODULE

CROSS-REFERENCE TO RELATED APPLICATIONS

This application is based upon and claims the benefit of priority from Japanese Patent Application No. 2013-009624, filed on Jan. 22, 2013; the entire contents of all of which are incorporated herein by reference.

FIELD

Embodiments described herein relate generally to a solid-state imaging device, an imaging method, and a camera module.

BACKGROUND

Conventionally, regarding a solid-state imaging device, noise reduction function is important to obtain a high-quality image. Known main noises that affect imaging by a solid-state imaging device include pixel-based noise caused by a pixel and circuit-based noise caused by a circuit. Random noise is dominant in the pixel-based noise. The circuit-based noise may appear as a fixed pattern such as a horizontal line and a vertical line. These types of noise are reduced by improving a circuit configuration and by process tuning.

In recent years, noise reduction processing technology has progressed. Thus, it is difficult to adjust the balance between tuning of the pixel-based noise and tuning of the circuit-based noise. In the case where the random noise is prominent compared with the fixed pattern noise and the fixed pattern noise is buried in the random noise, the pixel-based noise is dominant as noise in the solid-state imaging device. In this case, in the case where the random noise is reduced by tuning the pixel-based noise, the fixed pattern noise becomes dominant. In the case where the fixed pattern noise is reduced by tuning the circuit-based noise, random noise becomes dominant. Since the circuit-based noise and the pixel-based noise need to be tuned while adjusting the balance of these noises, time and effort are spent on the process tuning.

In a low illumination scene, the small number of electrons generated by a pixel cause the small range of variation in random noise. Furthermore, in a low contrast scene, the fixed pattern noise becomes conspicuous. In this case, the fixed pattern noise becomes significant. Additionally, the more the signal-to-noise ratio of a pixel improves, the more the circuit-based noise becomes conspicuous compared with the pixel-based noise. In the case where the balance between the pixel-based noise and the circuit-based noise is adjusted, the pixel or the circuit may be used with lower characteristics compared with actually obtained characteristics.

DETAILED DESCRIPTION

In general, according to one embodiment, a solid-state imaging device includes a pixel array, an AD converter, an output level determining unit, a random number data generating unit, and an output selecting unit. The pixel array generates a signal charge corresponding to an amount of incident light. The AD converter converts an analog output signal from the pixel array into a digital output signal. The output level determining unit performs a level determination of the digital output signal by comparing the level of the digital output signal with a threshold value. The random number data generating unit generates random number data by random number processing on the level of the digital output signal. The output selecting unit selects any of the digital output signal subjected to an addition of the random number data, and the digital output signal not subjected to the addition of random number data corresponding to a result of the level determination.

Exemplary embodiments of a solid-state imaging device, an imaging method, and a camera module will be explained below in detail with reference to the accompanying drawings. The present invention is not limited to the following embodiments.

Figure 1:
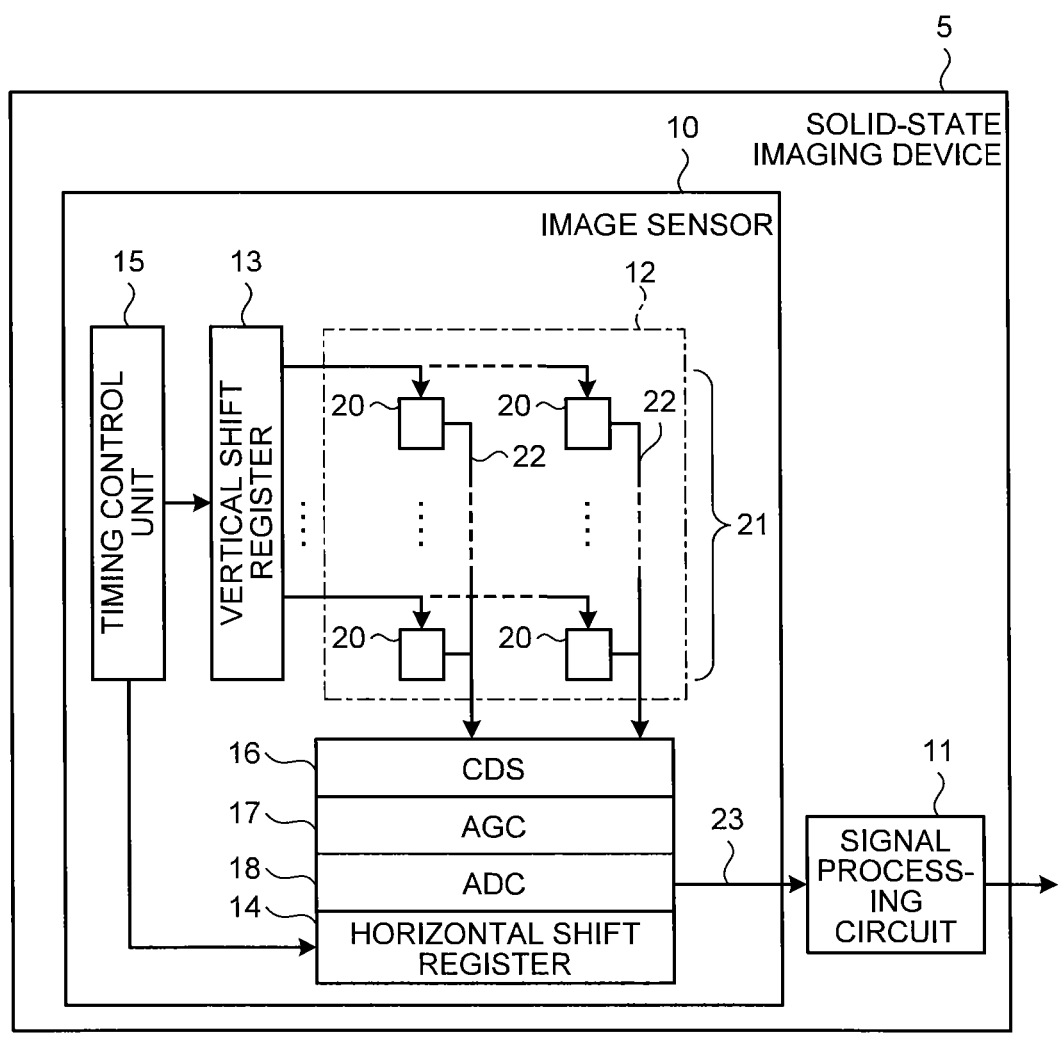
FIG. 1 is a block diagram illustrating a schematic configuration of a solid-state imaging device according to a first embodiment.
Figure 2:
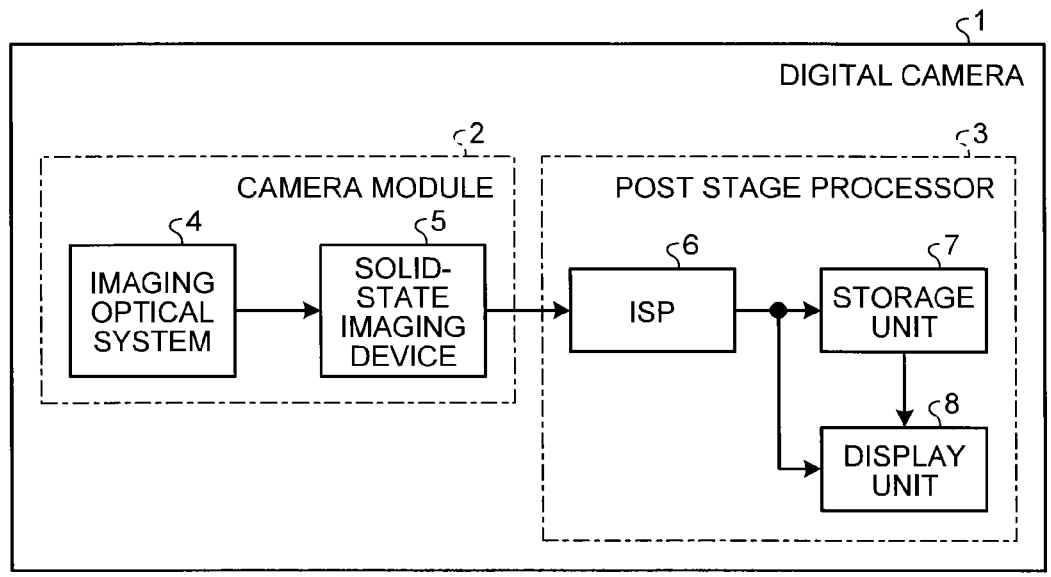
FIG. 2 is a block diagram illustrating a schematic configuration of a digital camera including the solid-state imaging device illustrated in FIG. 1.

FIG. 1 is a block diagram illustrating a schematic configuration of a solid-state imaging device according to a first embodiment. FIG. 2 is a block diagram illustrating a schematic configuration of a digital camera including the solid-state imaging device illustrated in FIG. 1.

A digital camera 1 includes a camera module 2 and a post stage processor 3. The camera module 2 has an imaging optical system 4 and a solid-state imaging device 5. The post stage processor 3 includes an ISP (image signal processor) 6, a storage unit 7, and a display unit 8. The camera module 2 is applied not only to the digital camera 1 but also to, for example, an electronic device such as a camera-attached portable terminal.

The imaging optical system 4 receives light from an object and forms an object image. The solid-state imaging device 5 takes the object image. The ISP 6 performs signal processing of an image signal obtained by an imaging in the solid-state imaging device 5. The storage unit 7 stores the image to which the signal processing by the ISP 6 is subjected. The storage unit 7 outputs the image signal to the display unit 8 in response to user operation and the like. The display unit 8 displays the image corresponding to the image signal input from the ISP 6 or the storage unit 7. The display unit 8 is, for example, a liquid crystal display.

The solid-state imaging device 5 includes an image sensor 10 and a signal processing circuit 11. The image sensor 10 is, for example, a CMOS (complementary metal oxide semiconductor) image sensor. The image sensor 10 includes a vertical shift register 13, a horizontal shift register 14, a timing control unit 15, a CDS (correlated double sampling) unit 16, an AGC (automatic gain control) unit 17, an ADC (analog-to-digital converter) 18, and a pixel array 21.

The pixel array 21 is formed in an imaging region 12 of the image sensor 10. The pixel array 21 has a plurality of pixels 20 arranged in an array shape to a horizontal direction (in rows) and a perpendicular direction (in columns). Each of the pixels 20 has a photodiode, which is a photoelectric conversion element.

The timing control unit 15 supplies a timing signal, which controls the timing to read the signals from each pixel 20 of the pixel array 21, to the vertical shift register 13 and the horizontal shift register 14. The vertical shift register 13 selects the pixels 20 inside the pixel array 21 for every row corresponding to the timing signal from the timing control unit 15. The vertical shift register 13 outputs a readout signal to each pixel 20 of the selected row.

The pixel 20 where the readout signal read from the vertical shift register 13 is input outputs a signal charge accumulated corresponding to the amount of incident light. The pixel array 21 generates the signal charge corresponding to the amount of incident light. The pixel array 21 outputs the signals from the pixels 20 to the CDS 16 via a vertical signal line 22. The vertical shift register 13 functions as a row selecting circuit, which selects the row of the pixels 20 from which the signal charge is read within the pixel array 21.

The CDS 16 performs correlated double sampling processing for reduction of fixed pattern noise with respect to an analog output signal from the pixel array 21. The AGC 17 amplifies the analog output signal to which the correlated double sampling processing by the CDS 16 is subjected. The ADC 18 converts the analog output signal to which the amplification by the AGC 17 is subjected into a digital output signal 23.

The horizontal shift register 14 reads the digital output signal 23 from the ADC 18 sequentially corresponding to the timing signal from the timing control unit 15. The signal processing circuit 11 performs various kinds of signal processing with respect to the digital output signal 23 read by the horizontal shift register 14. In addition to the noise reduction processing to be described later, for example, the signal processing circuit 11 performs a signal processing such as defect correction, shading correction, white balance adjustment, and similar processing.

Figure 3:
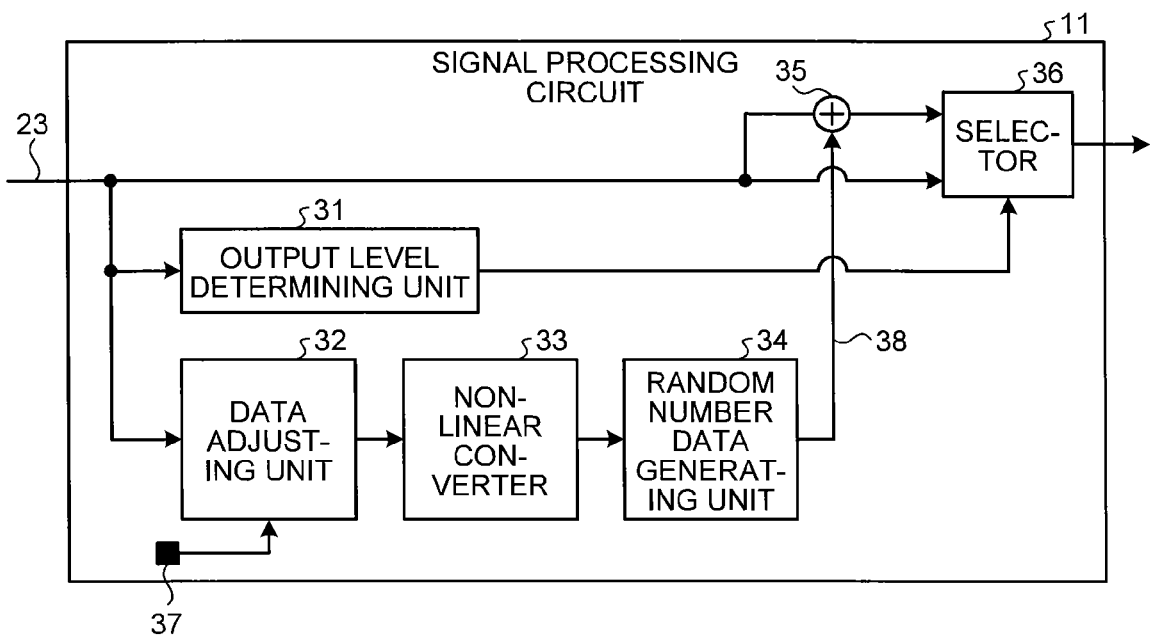
FIG. 3 is a block diagram illustrating a configuration for noise reduction processing in a signal processing circuit.

FIG. 3 is a block diagram illustrating a configuration for noise reduction processing in a signal processing circuit. The signal processing circuit 11 includes an output level determining unit 31, a data adjusting unit 32, a nonlinear converter 33, a random number data generating unit 34, an adder 35, and a selector 36 as a configuration for noise reduction processing.

The output level determining unit 31 performs a level determination of the digital output signal 23 from the ADC 18. This level determination is assumed to be based on comparing the level of the digital output signal 23 with a predetermined threshold value. The threshold value is to serve as the reference for determining the environment at the time of photography by the digital camera 1 is low illumination or high illumination. The data adjusting unit 32 performs adjustments based on a parameter 37 to the digital output signal 23 from the ADC 18. The signal processing circuit 11 retains the parameter 37 in advance.

Figure 4:
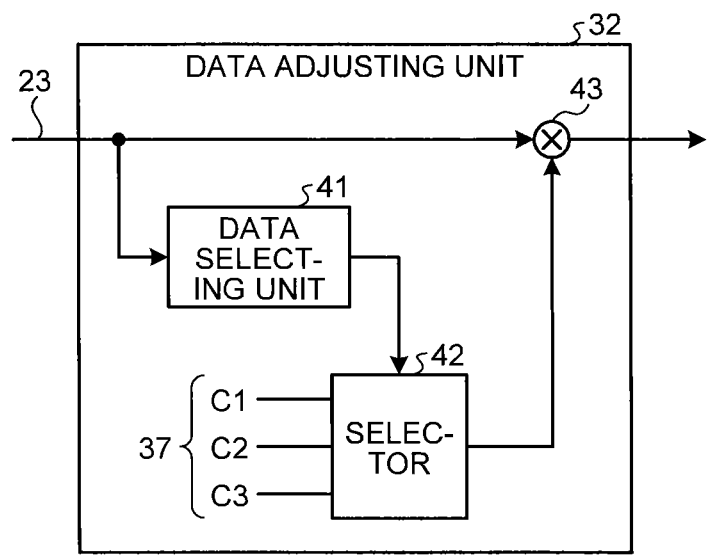
FIG. 4 is a block diagram illustrating a configuration example of a data adjusting unit.

FIG. 4 is a block diagram illustrating a configuration example of a data adjusting unit. The data adjusting unit 32 includes a data selecting unit 41, a selector 42, and a multiplier 43. The data adjusting unit 32 adjusts the digital output signal 23 by using among, for example, coefficients C1, C2, and C3, which are the parameter 37.

The data selecting unit 41 commands the selector 42 to select one among the coefficients C1, C2, and C3 corresponding to the level of the digital output signal 23 input into the data adjusting unit 32. The selector 42 selects one of the coefficients C1, C2, and C3 corresponding to the command from the data selecting unit 41. The coefficients C1, C2, and C3 are the coefficient for adjusting the level of components to be added to the digital output signal 23 in the adder 35. The coefficient that is assumed as the parameter 37 is not limited to the case of three coefficients.

The multiplier 43 multiplies the digital output signal 23 input into the data adjusting unit 32 by the coefficients C1 and C2 or C3 selected by the selector 42. The data adjusting unit 32 outputs the digital output signal 23 to which the multiplication by the multiplier 43 is subjected. The data adjusting unit 32 selects one of the coefficients C1 and C2 or C3, which are set in advance. Also, the data adjusting unit 32 may calculate a coefficient by an operation using the level of the digital output signal 23. The data adjustment method by the data adjusting unit 32 is not limited to a case of the description of the present embodiment. The method of the data adjustment may be changed correspondingly. The data adjusting unit 32 may divert the determination result in the output level determining unit 31 to the data adjustment corresponding to the level of the digital output signal 23.

The nonlinear converter 33 performs a nonlinear conversion on the digital output signal 23 with the data adjustment in the data adjusting unit 32. The nonlinear converter 33 presumes a noise level in the digital output signal 23 by a nonlinear conversion of the digital output signal 23.

Figure 5:
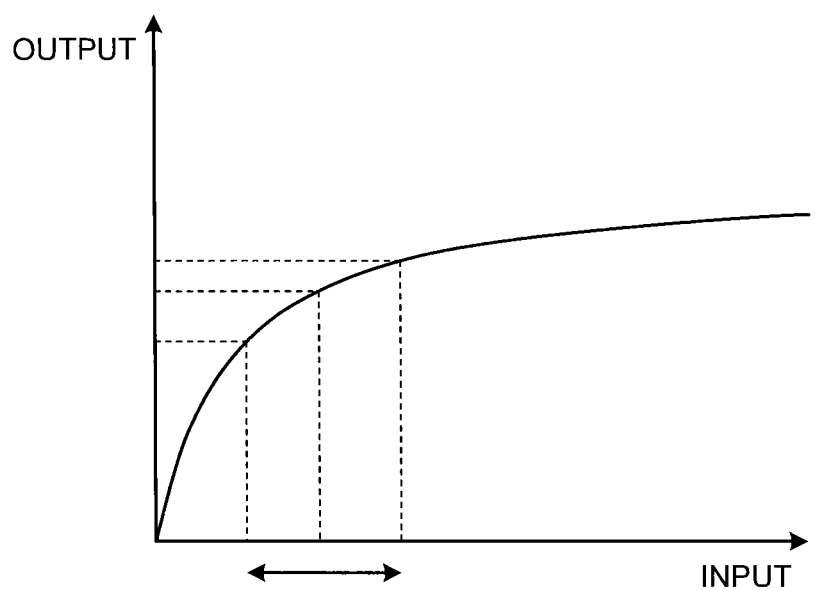
FIG. 5 is a diagram describing a nonlinear conversion in a nonlinear converter.

FIG. 5 is a diagram describing a nonlinear conversion in a nonlinear converter. The horizontal axis of FIG. 5 indicates the level of the digital output signal 23 input into the nonlinear converter 33. The vertical axis of FIG. 5 indicates the level of the digital output signal 23 subjected to the nonlinear conversion in the nonlinear converter 33. The level of the optical shot noise, which is a random noise, is known to be proportional to the square root of the number of electrons generated by the pixels 20. The nonlinear converter 33 obtains the noise level in the digital output signal 23 by a nonlinear conversion based on such a relationship.

The random number data generating unit 34 performs a random number processing on the level of the digital output signal 23 subjected to the data adjustment in the data adjusting unit 32 and the nonlinear conversion in the nonlinear converter 33. The random number data generating unit 34 generates random number data 38 by random number processing.

Figure 6:
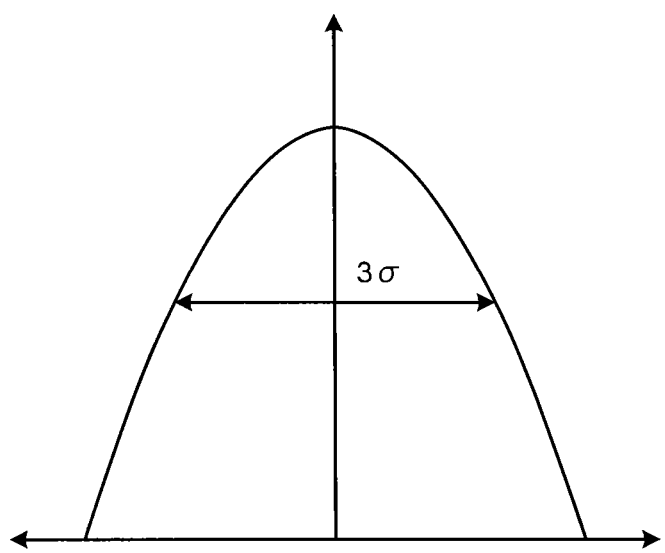
FIG. 6 is a diagram illustrating a distribution example of random number data generated by a random number data generating unit.

FIG. 6 is a diagram illustrating a distribution example of random number data generated by a random number data generating unit. The random number data generating unit 34 generates the random number data 38 assumed to be as, for example, $3\sigma$ for the dispersion in a normal distribution with respect to the level of the digital output signal 23 from the nonlinear converter 33. The range of the random number is adjusted by the parameter 37 in the data adjusting unit 32.

The adder 35 adds the random number data 38 generated by the random number data generating unit 34 to the digital output signal 23, which is input into the signal processing circuit 11. The selector 36 is an output selecting unit. Using a signal from the output level determining unit 31 as a selection control input signal, the selector 36 selects the signal from the adder 35 or the digital output signal 23 that is input to the signal processing circuit 11. The selector 36 selects the digital output signal 23 subjected to the addition of the random number data 38 or the digital output signal 23 not subjected to the addition of the random number data 38 corresponding to the determination result at the output level determining unit 31.

When the level determination is performed that the level of the digital output signal 23 is less than a predetermined threshold value at the output level determining unit 31, the selector 36 selects the digital output signal 23 subjected to the addition of the random number data 38. When the level determination is performed that the level of the digital output signal 23 is equal to or more than the predetermined threshold value at the output level determining unit 31, the selector 36 selects the digital output signal 23 not subjected to the addition of the random number data 38.

Figure 7:
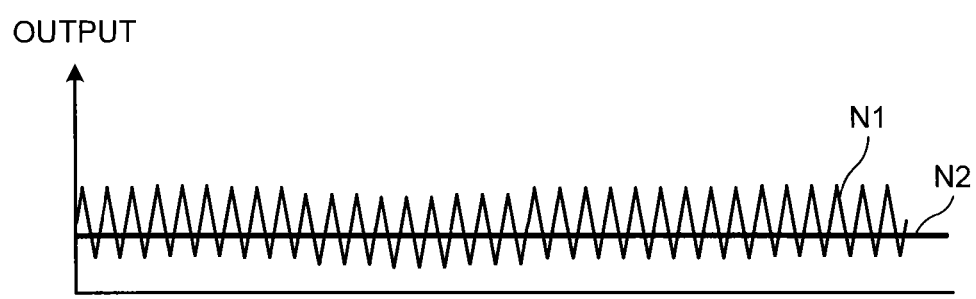
FIGS. 7 to 9 are diagrams describing a balance between the level of random noise and the level of fixed pattern noise.
Figure 8:
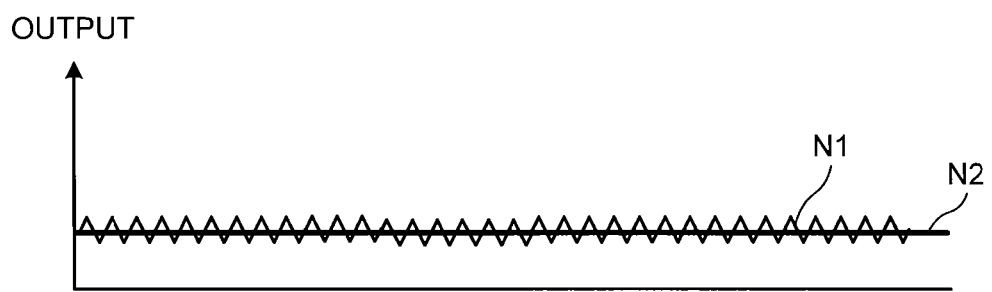
Figure 9:
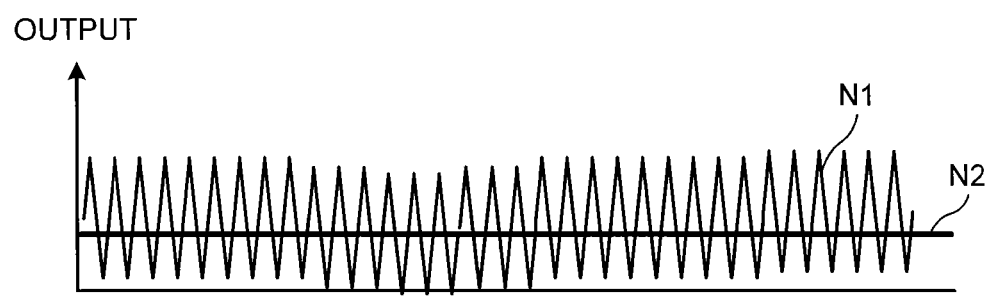

FIG. 7, FIG. 8, and FIG. 9 are diagrams describing a balance between the level of random noise and the level of fixed pattern noise. In the balance state of random noise N1 and fixed pattern noise N2 illustrated in FIG. 8, the relative level of the random noise N1 is lower compared with the case illustrated in FIG. 7. FIG. 8 illustrates a comparatively high signal-to-noise ratio of the pixel array 21 and the state where the fixed pattern noise N2 is significant compared with the random noise N1.

In the balance state of the random noise N1 and the fixed pattern noise N2 illustrated in FIG. 9, the relative level of the random noise N1 is high compared with the case illustrated in FIG. 7. FIG. 9 illustrates a comparatively low signal-to-noise ratio of the pixel array 21 and the state where the random noise N1 is significant compared with the fixed pattern noise N2.

When the level of the digital output signal 23 is less than the predetermined threshold value, that is, in a scene of low illumination, the number of electrons generated in each pixel is small. Thus, the variation width of the random noise N1 becomes comparatively small. For example, the random noise N1 and the fixed pattern noise N2 at a specific illumination are also assumed to become further lower illumination as the balance state illustrated in FIG. 7. The variation width of the random noise N1 becomes small. Hence, the balance between the random noise N1 and the fixed pattern noise N2 changes from the state illustrated in FIG. 7 to the state illustrated, for example, in FIG. 8. While the variation width of the random noise N1 decreases, the fixed pattern noise N2 is likely to become conspicuous because the level of the fixed pattern noise N2 does not change.

In this case, the signal processing circuit 11 applies the digital output signal 23 subjected to the addition of the random number data 38. Hence, the signal processing circuit 11 disperses the fixed pattern noise N2. As a result, the solid-state imaging device 5 reduces the fixed pattern noise N2 in a low illumination scene where the fixed pattern noise N2 is likely to be conspicuous.

On the other hand, when the level of the digital output signal 23 is equal to or more than a predetermined threshold value, that is, in a high illumination scene, the variation width of the random noise is larger compared with the low illumination scene. In this case, the relative level of the random noise N1 is high compared with the fixed pattern noise N2. Thus, the fixed pattern noise N2 becomes less conspicuous compared with the low illumination scene.

In this case, the signal processing circuit 11 applies the digital output signal 23 not subjected to the addition of the random number data 38 so as to keep the fixed pattern noise N2 is not dispersed. As a result, the solid-state imaging device 5, in the high illumination scene where the fixed pattern noise N2 is less conspicuous, maintains a balance between the random noise N1 and the fixed pattern noise N2. Then, the solid-state imaging device 5 suppresses a decrease of the signal-to-noise ratio.

With the present embodiment, the solid-state imaging device 5 provides an effect that high-quality images can be achieved by effective noise reduction processing corresponding to the illumination environment at the time of photography.

Figure 10:
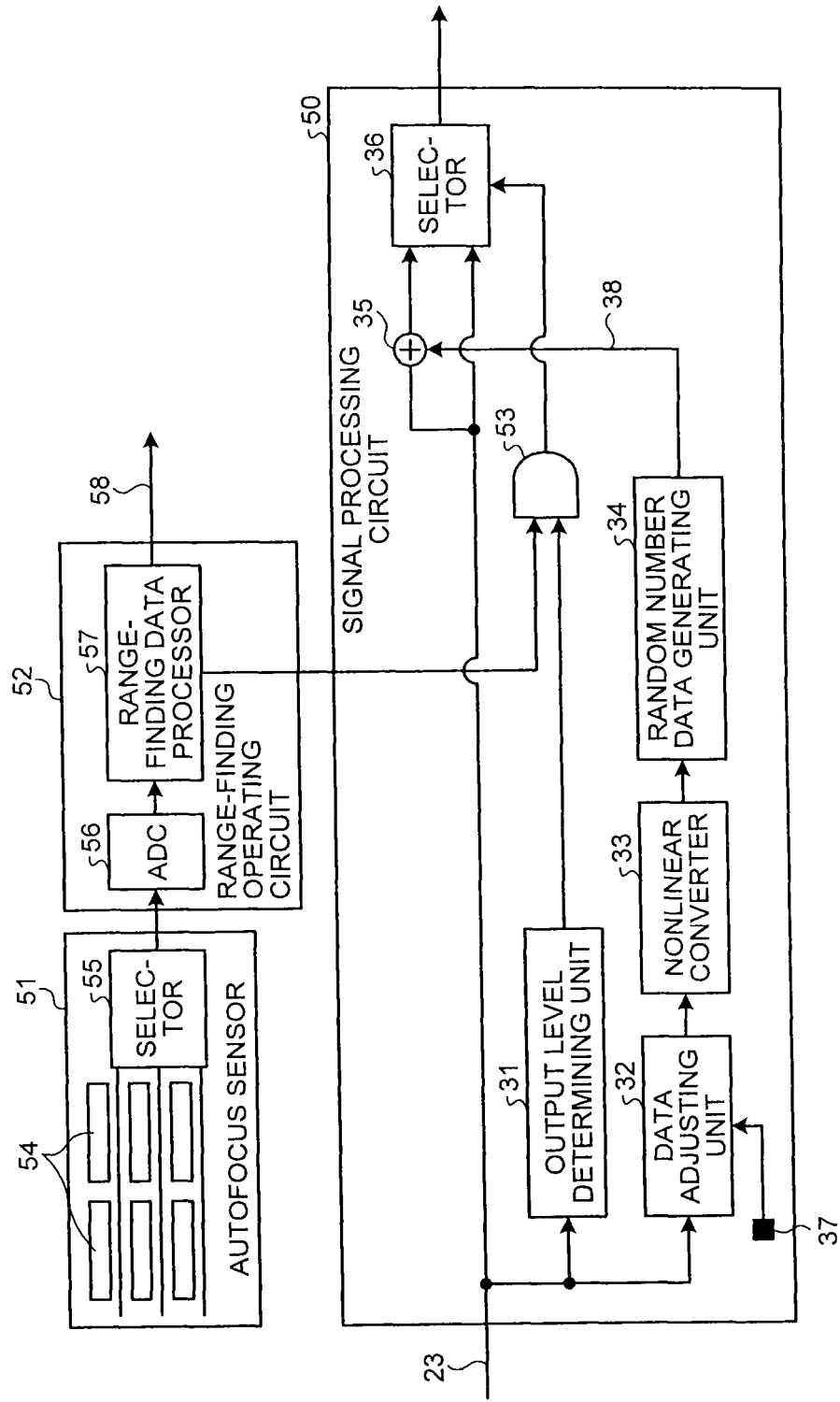
FIG. 10 is a block diagram illustrating a partial schematic configuration of the solid-state imaging device according to a second embodiment.

FIG. 10 is a block diagram illustrating a partial schematic configuration of the solid-state imaging device according to, a second embodiment. The solid-state imaging device includes a signal processing circuit 50, an AF (autofocus) sensor 51, and a range-finding operating circuit 52. The same reference numerals are given to the same parts as the first embodiment, and the description thereof will not be repeated correspondingly.

The image sensor 10 (see FIG. 1) is assumed to be a first imaging device that takes an object image. The AF sensor 51 performs an optical detection for AF adjustment of the imaging optical system 4 (see FIG. 2). The AF sensor 51 functions as a second imaging device. The AF sensor 51 and the range-finding operating circuit 52, for example, perform an AF adjustment processing by the multipoint range-finding method.

The AF sensor 51 is provided independently from the image sensor 10 for obtaining the object image as, for example, a sensor dedicated for AF use. For example, the AF sensor 51 may be provided on the same chip as the image sensor 10. Also, the image sensor 10 for obtaining the object image may double the function as the AF sensor 51.

The AF sensor 51 includes a plurality of line sensors 54 and a selector 55. The plurality of line sensors 54 detect the luminance for every area in the image projected in the imaging region 12. The selector 55 selects one of the outputs from the respective line sensors 54.

The range-finding operating circuit 52 performs a calculation and a processing of the range-finding data used for AF control. The range-finding operating circuit 52 includes an ADC (analog-to-digital converter) 56 and a range-finding data processor 57. The ADC 56 converts the output from the AF sensor 51 into a digital form from an analog form.

The range-finding data processor 57 determines which area in the AF sensor 51 is used to detect the luminance using the signal from the ADC 56 (area determination). The range-finding data processor 57 determines the contrast of an image from the detection result of the luminance for each area (contrast determination). Furthermore, the range-finding data processor 57 detects where the focus state is at maximum contrast from the change in contrast each time the imaging optical system 4 is driven.

The range-finding data processor 57 calculates a distance to the object at a time of focusing as the range-finding data. The range-finding data processor 57 generates a lens driving signal 58 based on the range-finding data. The lens driving unit (not illustrated) for driving the imaging optical system 4 drives the lens of the imaging optical system 4 corresponding to the lens driving signal 58.

For example, the output level determining unit 31 outputs "0" when the level of the digital output signal 23 is equal to or more than a predetermined threshold value. The output level determining unit 31 outputs "1" when the level of the digital output signal 23 is less than the predetermined threshold value.

The range-finding data processor 57 performs the contrast determination of the image. This contrast determination is to be performed by comparing the contrast value during the focus time with the predetermined threshold value. The range-finding data processor 57 outputs the result of the contrast determination to the signal processing circuit 50. For example, the range-finding data processor 57 outputs "0" when the contrast value is equal to or more than the predetermined threshold value. The range-finding data processor 57 outputs "1" when the contrast value is less than the predetermined threshold value. This threshold value is to serve as the reference for determining the image taken by the digital camera 1 is the low contrast or the high contrast. The range-finding data processor 57 performs the contrast determination for every area of the image taken by digital camera 1.

In addition to the elements that the signal processing circuit 11 (see FIG. 3) of the first embodiment includes, the signal processing circuit 50 includes an AND circuit 53. The AND circuit 53 outputs the logical multiplication of the result of the level determination from the output level determining unit 31 and the result of the contrast determination from the range-finding data processor 57. Using a signal from the AND circuit 53 as a selection control input signal, the selector 36 selects the signal from the adder 35 or the digital output signal 23 that is input into the signal processing circuit 11. The selector 36 selects the digital output signal 23 subjected to the addition of the random number data 38 or the digital output signal 23 not subjected to the addition of the random number data 38. The selector 36 selects a signal corresponding to the result of the level determination by the output level determining unit 31 and the result of the contrast determination by the range-finding data processor 57.

When "1" is input from the AND circuit 53, the selector 36 selects the digital output signal 23 subjected to the addition of the random number data 38. When the level determination determines that the level of the digital output signal 23 is less than the predetermined threshold value is performed at the output level determining unit 31, and a contrast determination determines that the contrast value is less than a predetermined threshold value is performed at the range-finding data processor 57, the selector 36 selects the digital output signal 23 subjected to the addition of the random number data 38.

When "0" is input from the AND circuit 53, the selector 36 selects the digital output signal 23 not subjected to the addition of the random number data 38. When at least one of the level determination and the contrast determination is performed, the selector 36 selects the digital output signal 23 not subjected to the addition of the random number data 38. This level determination determines that the level of the digital output signal 23 is equal to or more than the predetermined threshold value. This contrast determination determines that the contrast value is assumed to be equal to or more than the predetermined threshold value.

In a scene of low illumination and low contrast, the fixed pattern noise is likely to become conspicuous. In this case, the signal processing circuit 11 applies the digital output signal 23 subjected to the addition of the random number data 38 to disperse the fixed pattern noise. As a result, the solid-state imaging device restricts the fixed pattern noise in the low contrast area where the fixed pattern noise is likely to become conspicuous within the low illumination scene.

On the other hand, when at least one of high illumination and high contrast is satisfied, the fixed pattern noise is less conspicuous compared with the low illumination and the low contrast conditions. In this case, the signal processing circuit 11 applies the digital output signal 23 not subjected to the addition of the random number data 38 to keep the fixed pattern noise not dispersed. As a result, in the scene where the fixed pattern noise is less conspicuous, the solid-state imaging device maintains the balance between the random noise and the fixed pattern noise to suppress the decrease of the signal-to-noise ratio.

With the present embodiment, the solid-state imaging device provides an effect that high-quality images can be achieved by effective noise reduction processing corresponding to the illumination environment and contrast at the time of photography. The range-finding data processor 57 is not limited to the case that performs the contrast determination for every area of the image. The range-finding data processor 57 may perform the contrast determination of the entire image. The digital output signal 23 subjected to the addition of the random number data 38 may be applied to each area of the image. Also, the digital output signal 23 may apply to the entire image for low illumination and low contrast determinations.

Figure 11:
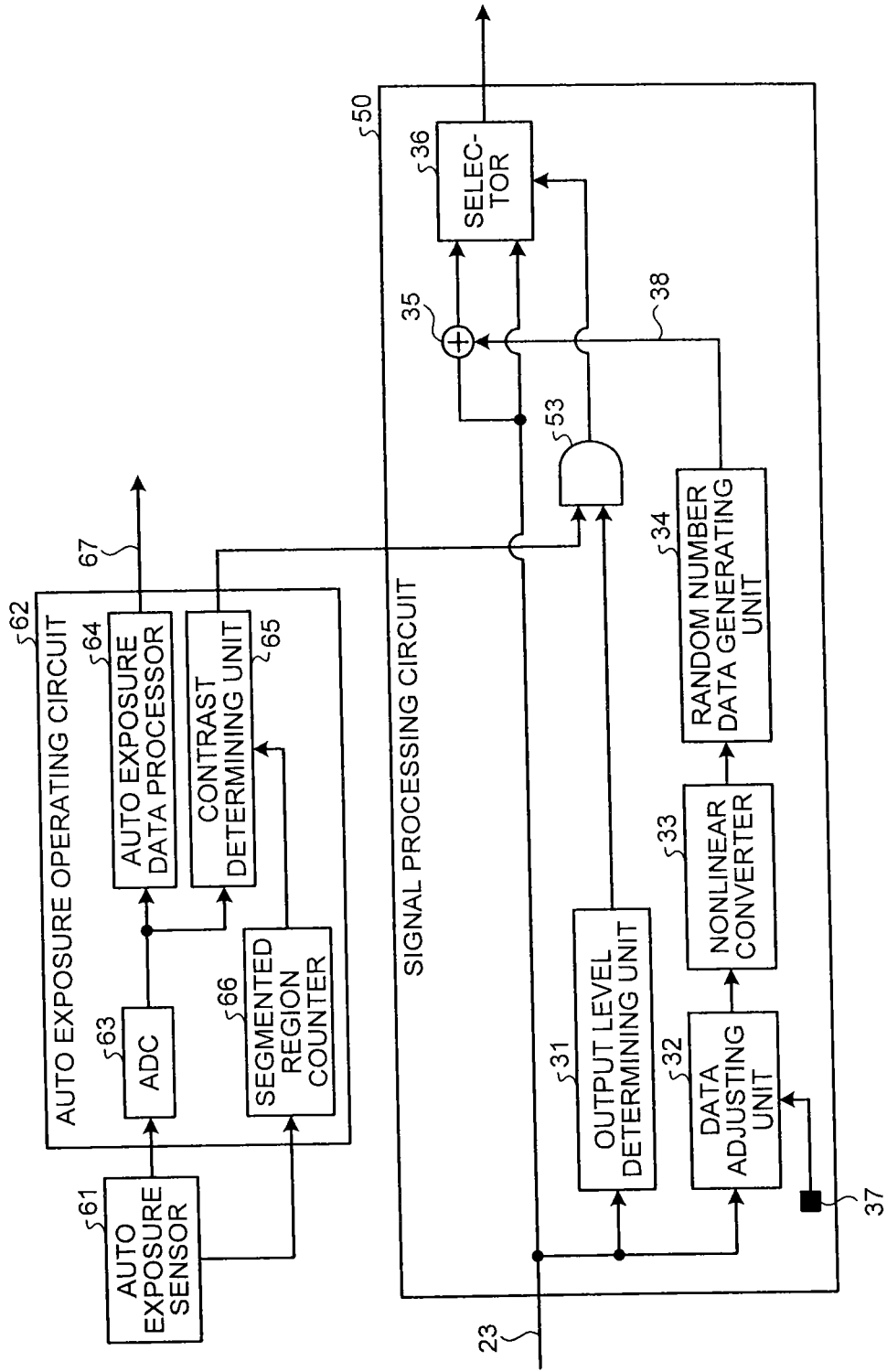
FIG. 11 is a block diagram illustrating a partial schematic configuration of the solid-state imaging device according to a third embodiment.

FIG. 11 is a block diagram illustrating a partial schematic configuration of the solid-state imaging device according to a third embodiment. The solid-state imaging device includes the signal processing circuit 50, an AE (auto exposure) sensor 61, and an AE operating circuit 62. The same reference numerals are given to the same parts as aforementioned the first and the second embodiments, and the description thereof will not be repeated correspondingly.

The image sensor 10 (see FIG. 1) is assumed to be as a first imaging device that takes an object image. The AE sensor 61 performs the optical detection for AE adjustment of the camera module 2 (see FIG. 2). The AE sensor 61 functions as a second imaging device. The AE sensor 61 and the AE operating circuit 62 perform, for example, the AE adjustment processing by the multipoint AE method.

The AE sensor 61, for example, as a sensor dedicated for AE use, is assumed to be provided independently from the image sensor 10 for obtaining the object image. The AE sensor 61, for example, may be formed on the same chip as that of the image sensor 10. Also, the image sensor 10 for obtaining the object image may double the function as the AE sensor 61.

The AE operating circuit 62 performs the calculation and the processing of the AE data used for the AE adjustment. The AE operating circuit 62 includes an ADC (analog-to-digital converter) 63, an AE data processor 64, a contrast determining unit 65, and a segmented region counter 66. The ADC 63 converts an output from the AE sensor 61 into a digital form from an analog form.

The AE data processor 64 calculates the AE data for AE adjustment from a signal from the ADC 56 signal. The AE data processor 64 generates, for example, a diaphragm driving signal 67 based on the AE data. A diaphragm driving device (not illustrated) to drive a diaphragm inside the imaging optical system 4 drives the diaphragm corresponding to the diaphragm driving signal 67. The AE data processor 64 may generate a signal for adjusting a shutter speed based on the AE data.

The segmented region counter 66 divides the photometric range by the AE sensor 61 into a plurality of regions. Then, the segmented region counter 66 generates the discrimination count for each segmented region. The segmented region counter 66 generates the discrimination count for each segmented region, for example, based on the horizontal count and the vertical count that are applied to the AE sensor 61. The contrast determining unit 65 calculates the contrast value for each segmented region, based on the signal from the ADC 56 and the discrimination count from the segmented region counter 66.

For example, the output level determining unit 31 outputs "0" when the level of the digital output signal 23 is equal to or more than the predetermined threshold value. The output level determining unit 31 outputs "1" when the level of the digital output signal 23 is less than the predetermined threshold value.

The contrast determining unit 65 performs the contrast determination of the image. This contrast determination is assumed to be performed by comparing the contrast value obtained from the photometric result with the predetermined threshold value. The contrast determining unit 65 outputs the result of the contrast determination to the signal processing circuit 50. For example, the contrast determining unit 65 outputs "0" when the contrast value is equal to or more than the predetermined threshold value. The contrast determining unit 65 outputs "1" when the contrast value is less than the predetermined threshold value. This threshold value is to serve as the reference for determining the image taken by the digital camera 1 in low contrast or high contrast. The contrast determining unit 65 performs the contrast determination for every segmented area.

The AND circuit 53 outputs the logical multiplication of the result of the level determination from the output level determining unit 31 and the result of the contrast determination from the contrast determining unit 65. The selector 36 selects the signal from the adder 35 or the digital output signal 23 that is input into the signal processing circuit 11 using the signal from the AND circuit 53 as the selection control input signal. The selector 36 selects the digital output signal 23 subjected to the addition of the random number data 38 or the digital output signal 23 not subjected to the addition of the random number data 38 based on the result of the level determination by the output level determining unit 31 and the result of the contrast determination by the contrast determining unit 65.

When "1" is input from the AND circuit 53, the selector 36 selects the digital output signal 23 subjected to the addition of the random number data 38. When the level of the digital output signal 23 is less than the predetermined threshold value and a contrast determination determines that the contrast value is less than the predetermined threshold value is performed at the contrast determining unit 65, the selector 36 selects the digital output signal 23 subjected to the addition of the random number data 38.

When "0" is input from the AND circuit 53, the selector 36 selects the digital output signal 23 not subjected to the addition of the random number data 38. When at least one of the level determination and the contrast determination is performed, the selector 36 selects the digital output signal 23 not subjected to the addition of the random number data 38. This level determination determines that the level of the digital output signal 23 is equal to or more than the predetermined threshold value. This contrast determination determines that the contrast value is equal to or more than the predetermined threshold value.

In a low illumination scene with a low contrast, fixed pattern noise is likely to become conspicuous. In this case, the signal processing circuit 11 applies the digital output signal 23 subjected to the addition of the random number data 38 to disperse the fixed pattern noise. As a result, the solid-state imaging device suppresses the fixed pattern noise in the low contrast area where the fixed pattern noise is likely to be conspicuous within the low illumination scene.

On the other hand, when at least one of high illumination and high contrast is satisfied, the fixed pattern noise is less conspicuous compared with the low illumination and the low contrast condition. In this case, the signal processing circuit 11 applies the digital output signal 23 not subjected to the addition of the random number data 38 to keep the fixed pattern noise not dispersed. As a result, in the scene where the fixed pattern noise is less conspicuous, the solid-state imaging device maintains the balance between the random noise and the fixed pattern noise, thus suppressing the decrease of the signal-to-noise ratio.

With the present embodiment, the solid-state imaging device effectively provides a high-quality image that can be achieved by effective noise reduction processing corresponding to the illumination environment and contrast at the time of photography. The range-finding data processor 57 is not limited to the case that performs the contrast determination for each segmented area. The range-finding data processor 57 may perform the contrast determination of the entire image. The digital output signal 23 subjected to the addition of the random number data 38 may be applied to each segmented area. Also, the digital output signal 23 may be applied to the entire image for low illumination and low contrast determinations.

Figure 12:
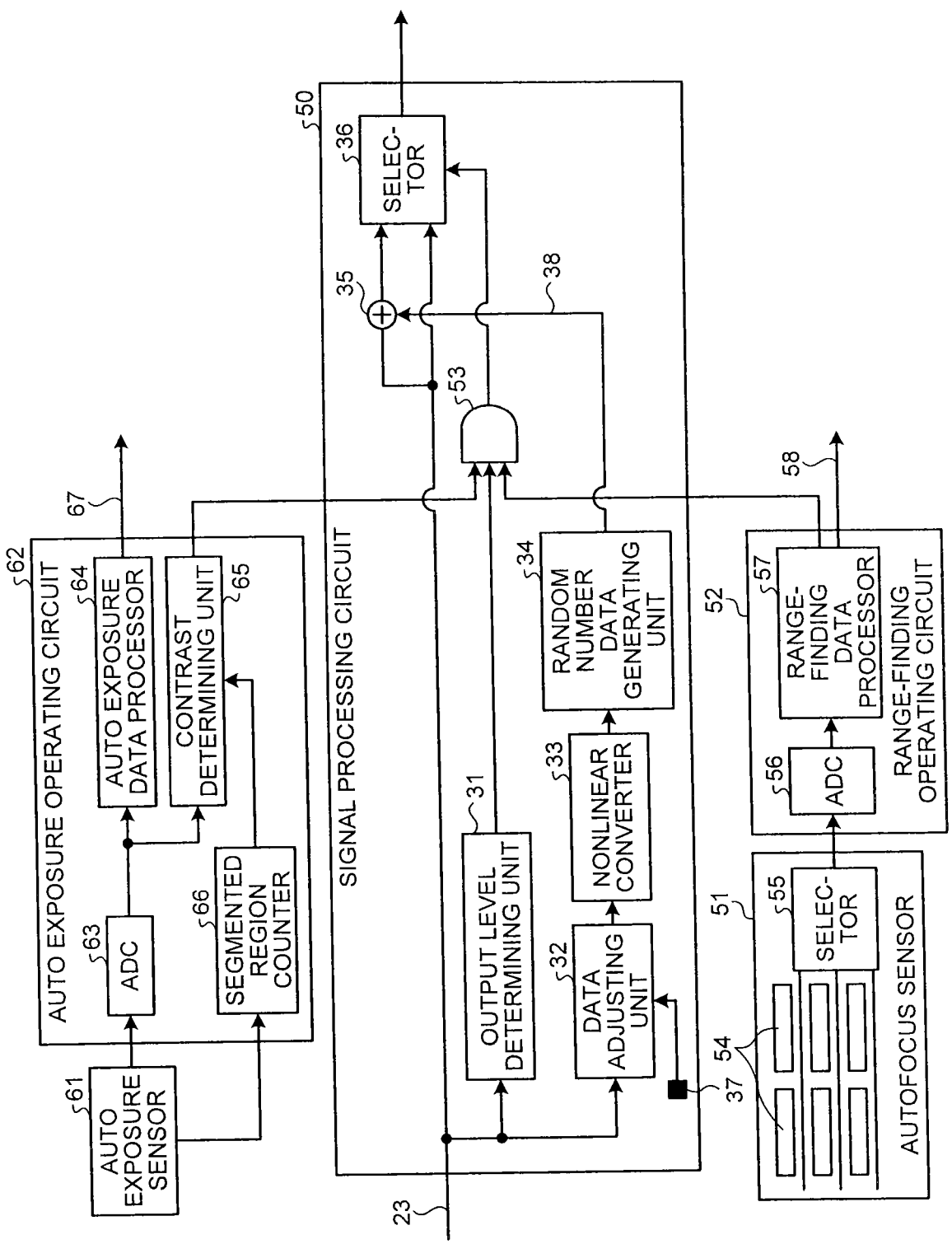
FIG. 12 is a block diagram illustrating a partial schematic configuration of the solid-state imaging device according to a fourth embodiment.

FIG. 12 is a block diagram illustrating a partial schematic configuration of the solid-state imaging device according to a fourth embodiment. The solid-state imaging device includes the signal processing circuit 50, the AF (autofocus) sensor 51, the range-finding operating circuit 52, the AE (auto exposure) sensor 61, and the AE operating circuit 62. The configuration of the fourth embodiment is combined with the configurations of the second and the third embodiments. The same reference numerals are given to the same parts as those of the first to the third embodiments, and the description thereof will not be repeated correspondingly.

The image sensor 10 (see FIG. 1) is assumed to be a first imaging device that takes an object image. The AF sensor 51 and the AE sensor 61 function as a second imaging device. For example, the output level determining unit 31 outputs "0" when the level of the digital output signal 23 is equal to or more than the predetermined threshold value. The output level determining unit 31 outputs "1" when the level of the digital output signal 23 is less than the predetermined threshold value.

For example, the range-finding data processor 57 outputs "0" when the contrast value is equal to or more than the predetermined threshold value. The range-finding data processor 57 outputs "1" when the contrast value is less than the predetermined threshold value. For example, the contrast determining unit 65 outputs "0" when the contrast value is equal to or more than the predetermined threshold value. The contrast determining unit 65 outputs "1" when the contrast value is less than the predetermined threshold value.

The AND circuit 53 outputs the logical multiplication of the result of the level determination from the output level determining unit 31, the result of the contrast determination from the range-finding data processor 57, and the result of contrast determination from the contrast determining unit 65. The selector 36 selects the signal from the adder 35 or the digital output signal 23 that is input into the signal processing circuit 11 using the signal from the AND circuit 53 as the selection control input signal.

The selector 36 selects the digital output signal 23 subjected to the addition of the random number data 38 or the digital output signal 23 not subjected to the addition of the random number data 38 corresponding to the result of the level determination in the output level determining unit 31, the result of the first contrast determination in the range-finding data processor 57, and the result of the second contrast determination in the contrast determining unit 65. The result of the first contrast determination is the result of the contrast determination with respect to the contrast detected for the range-finding data operation. The result of the second contrast determination is the result of the contrast determination based on the photometric result.

When "1" is input from the AND circuit 53, the selector 36 selects the digital output signal 23 subjected to the addition of the random number data 38. When the level determination determines that the level of the digital output signal 23 is less than the predetermined threshold value is performed at the output level determining unit 31, and the contrast determination determines that the contrast value is less than the predetermined threshold value is performed at the range-finding data processor 57 and the contrast determining unit 65, the selector 36 selects the digital output signal 23 subjected to the addition of the random number data 38.

When "0" is input from the AND circuit 53, the selector 36 selects the digital output signal 23 not subjected to the addition of the random number data 38. When at least one of the level determination and the contrast determinations is performed, the selector 36 selects the digital output signal 23 not subjected to the addition of the random number data 38. This level determination determines that the level of the digital output signal 23 is equal to or more than the predetermined threshold value. These contrast determinations by the range-finding data processor 57 and the contrast determining unit 65 determine that the contrast value is equal to or more than the predetermined threshold value.

With the present embodiment, the solid-state imaging device effectively provides a high-quality image that can be achieved by effective noise reduction processing corresponding to the illumination environment and contrast at the time of photography. The range-finding data processor 57 is not limited to the case that performs contrast determination for each area of the image. The range-finding data processor 57 may perform the contrast determination of the entire image. The digital output signal 23 subjected to the addition of the random number data 38 is applied to each area of the image. Also, the digital output signal 23 may apply to the entire image for low illumination and low contrast determinations.

The range-finding data processor 57 is not limited to the case that performs the contrast determination for each segmented area. The range-finding data processor 57 may perform the contrast determination of the entire image. The digital output signal 23 subjected to the addition of the random number data 38 may be applied to each segmented area. Also, the digital output signal 23 may be applied to the entire image for low illumination and low contrast determinations.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising:
   a pixel array configured to generate a signal charge corresponding to an amount of incident light;
   an AD converter configured to convert an analog output signal from the pixel array into a digital output signal;
   an output level determining unit configured to perform a level determination of the digital output signal by comparing a level of the digital output signal with a threshold value;
   a random number data generating unit configured to generate random number data by random number processing on the level of the digital output signal; and
   an output selecting unit configured to select any of: the digital output signal subjected to an addition of the random number data, and the digital output signal not subjected to the addition of the random number data corresponding to a result of the level determination.

2. The solid-state imaging device according to claim 1, further comprising
   a nonlinear converter configured to perform a nonlinear conversion on the digital output signal, wherein
   the random number data generating unit performs the random number processing on the digital output signal subjected to the nonlinear conversion in the nonlinear converter.

3. The solid-state imaging device according to claim 2, further comprising
   a data adjusting unit configured to perform data adjustment on the digital output signal corresponding to the level of the digital output signal, wherein
   the nonlinear converter performs the nonlinear conversion on the digital output signal subjected to the data adjustment in the data adjusting unit.

4. The solid-state imaging device according to claim 3, wherein
   the data adjusting unit includes:
   a data selecting unit configured to select any of a plurality of coefficients corresponding to the level of the digital output signal; and
   a multiplier configured to multiply the digital output signal by a coefficient, the digital output signal being input into the data adjusting unit, the coefficient being selected by the data selecting unit.

5. The solid-state imaging device according to claim 1, wherein
   in a case where the output level determining unit determines that the level of the digital output signal is less than the threshold value in the level determination, the output selecting unit selects the digital output signal subjected to the addition of the random number data, and
   in a case where the output level determining unit determines that the level of the digital output signal is equal to or more than the threshold value in the level determination, the output selecting unit selects the digital output signal not subjected to the addition of the random number data.

6. The solid-state imaging device according to claim 1, wherein
   the output selecting unit selects any of: the digital output signal subjected to the addition of the random number data, and the digital output signal not subjected to the addition of the random number data, the digital output signal being selected corresponding to the result of the level determination and a result of contrast determination.

7. The solid-state imaging device according to claim 6, wherein
   in a case where: the output level determining unit determines that the level of the digital output signal is less than the threshold value in the level determination; and a contrast value is determined to be less than a threshold value in the contrast determination, the output selecting unit selects the digital output signal subjected to the addition of the random number data.

8. The solid-state imaging device according to claim 1, further comprising a range-finding operating circuit configured to operate range-finding data to adjust a focus of an imaging optical system corresponding to a result of contrast detection, wherein the output selecting unit selects any of: the digital output signal subjected to the addition of the random number data, and the digital output signal not subjected to the addition of the random number data, the digital output signal being selected corresponding to: the result of the level determination, and a result of contrast determination with respect to the contrast.

9. The solid-state imaging device according to claim 8, wherein in a case where: the output level determining unit determines that the level of the digital output signal is less than the threshold value in the level determination; and a contrast value is determined to be less than a threshold value in the contrast determination at the range-finding operating circuit, the output selecting unit selects the digital output signal subjected to the addition of the random number data.

10. The solid-state imaging device according to claim 1, further comprising an exposure operating circuit configured to operate exposure data to adjust exposure of the solid-state imaging device corresponding to a photometric result, wherein the output selecting unit selects any of: the digital output signal subjected to the addition of the random number data, and the digital output signal not subjected to the addition of the random number data, the digital output signal being selected corresponding to: the result of the level determination, and a result of contrast determination based on the photometric result.

11. The solid-state imaging device according to claim 10, wherein in a case where: the output level determining unit determines that the level of the digital output signal is less than the threshold value in the level determination; and a contrast value is determined to be less than a threshold value in the contrast determination at the exposure operating circuit, the output selecting unit selects the digital output signal subjected to the addition of the random number data.

12. The solid-state imaging device according to claim 1, further comprising:

a range-finding operating circuit configured to operate range-finding data to adjust a focus of an imaging optical system corresponding to a result of contrast detection; and an exposure operating circuit configured to operate exposure data to adjust an exposure of the solid-state imaging device corresponding to a photometric result, wherein the output selecting unit selects any of: the digital output signal subjected to the addition of the random number data, and the digital output signal not subjected to the addition of the random number data, the digital output signal being selected corresponding to: the result of the level determination, a result of a first contrast determination with respect to the contrast detected for the range-finding data operation, and a result of a second contrast determination based on the photometric result.

13. An imaging method, comprising:

generating a signal charge corresponding to an amount of incident light to a pixel array;

converting an analog output signal from the pixel array into a digital output signal;

performing level determination of the digital output signal by comparing a level of the digital output signal with a threshold value;

generating random number data by random number processing with respect to the level of the digital output signal; and selecting any of: the digital output signal subjected to an addition of the random number data, and the digital output signal not subjected to the addition of the random number data, the digital output signal being selected as an output corresponding to the result of the level determination.

14. The imaging method according to claim 13, further comprising performing a nonlinear conversion on the digital output signal, wherein the random number processing is performed on the digital output signal subjected to the nonlinear conversion.

15. The imaging method according to claim 14, further comprising performing data adjustment on the digital output signal corresponding to the level of the digital output signal, wherein the nonlinear conversion is performed on the digital output signal subjected to the data adjustment.

16. The imaging method according to claim 15, wherein the data adjustment includes:

data selecting configured to select any of a plurality of coefficients corresponding to the level of the digital output signal; and multiplying the digital output signal by a coefficient, the coefficient being selected by the data selecting.

17. The imaging method according to claim 13, wherein in a case where the level determination determines that the level of the digital output signal is less than the threshold value, the digital output signal subjected to the addition of the random number data is selected as the output, and in a case where the level determination determines that the level of the digital output signal is equal to or more than the threshold value, the digital output signal not subjected to the addition of the random number data is selected as the output.

18. The imaging method according to claim 13, wherein any of: the digital output signal subjected to the addition of the random number data, and the digital output signal not subjected to the addition of the random number data is selected as the output corresponding to: the result of the level determination, and a result of a contrast determination.

19. The imaging method according to claim 18, wherein in a case where: the level determination determines that the level of the digital output signal is less than the threshold value; and the contrast determination determines that a contrast value is less than a threshold value, the digital output signal subjected to the addition of the random number data is selected as the output.

20. A camera module, comprising:

an imaging optical system configured to receive light from an object and form an object image; and a solid-state imaging device configured to convert the light received from the imaging optical system into a signal charge and take the object image, wherein the solid-state imaging device includes:

a pixel array configured to generate a signal charge corresponding to an amount of incident light;

an AD converter configured to convert an analog output signal from the pixel array into a digital output signal;

an output level determining unit configured to perform level determination of the digital output signal by comparing the level of the digital output signal with a threshold value;

a random number data generating unit configured to generate random number data by random number processing on the level of the digital output signal; and an output selecting unit configured to select any of: the digital output signal subjected to an addition of the random number data, and the digital output signal not subjected to the addition of the random number data, the digital output signal being selected corresponding to the result of the level determination.

* * * * *